US00RE39731E

(19) United States
(12) Reissued Patent
Woods

(10) Patent Number: US RE39,731 E
(45) Date of Reissued Patent: Jul. 17, 2007

(54) ALARM SWITCH

(75) Inventor: Randall Woods, Prescott, AZ (US)

(73) Assignee: Magnasphere Corporation, Waukesha, WI (US)

(21) Appl. No.: 09/916,535

(22) Filed: Jul. 27, 2001

Related U.S. Patent Documents

Reissue of:
(64) Patent No.: 5,977,873
Issued: Nov. 2, 1999
Appl. No.: 09/034,670
Filed: Mar. 4, 1998

(51) Int. Cl.
*G08B 13/08* (2006.01)

(52) U.S. Cl. ..... 340/547; 340/545.1; 335/205; 335/207

(58) Field of Classification Search ..... 340/542, 340/545.1, 547, 551; 335/205, 207; 200/61.7
See application file for complete search history.

(56) References Cited

U.S. PATENT DOCUMENTS 1,051,962 A * 2/1913 Lundquist ..... 116/86
1,192,893 A * 8/1916 Harvey ..... 116/88
1,868,923 A * 7/1932 Semon ..... 116/88
3,516,036 A * 6/1970 Lea ..... 335/207
3,535,664 A * 10/1970 Staar ..... 335/153
3,630,168 A * 12/1971 Findlay ..... 116/74
3,650,347 A * 3/1972 Campos ..... 180/282
3,763,484 A * 10/1973 Byers ..... 340/669
3,816,680 A * 6/1974 Suzuki et al. ..... 200/61.51
3,842,377 A * 10/1974 Barndt ..... 335/207
4,042,796 A * 8/1977 Zink ..... 200/61.45 R
4,057,773 A * 11/1977 Cohen ..... 335/205
4,062,314 A * 12/1977 Allen et al. ..... 116/85
4,168,410 A * 9/1979 Norris ..... 200/61.45 R
4,275,391 A * 6/1981 Okamura ..... 340/571
4,293,860 A * 10/1981 Iwata ..... 343/715
4,326,196 A * 4/1982 Plevy ..... 340/545.5
4,336,518 A * 6/1982 Holce et al. ..... 335/205
4,450,326 A * 5/1984 Ledger ..... 200/61.45 M
4,456,897 A * 6/1984 Holce et al. ..... 335/205
4,553,134 A * 11/1985 Holt ..... 340/546
4,567,846 A * 2/1986 Kurtz ..... 116/86
4,628,160 A * 12/1986 Canevari ..... 200/61.45 R
4,656,458 A * 4/1987 Iwata ..... 340/669
4,733,324 A * 3/1988 George ..... 361/118
4,788,517 A * 11/1988 Meister ..... 335/205
4,982,058 A * 1/1991 Schroeder et al. ..... 200/61.62
5,192,839 A * 3/1993 Imade et al. ..... 200/61.45 R
5,248,861 A * 9/1993 Kato et al. ..... 200/61.45 M
5,248,959 A * 9/1993 Chern ..... 340/601
5,332,992 A * 7/1994 Woods ..... 340/547
5,530,428 A * 6/1996 Woods ..... 340/547
5,543,767 A * 8/1996 Elenbaas ..... 335/205
5,673,021 A * 9/1997 Woods ..... 340/547
5,867,082 A * 2/1999 Van Zeeland ..... 335/205
5,880,659 A * 3/1999 Woods ..... 335/207

* cited by examiner

*Primary Examiner*—Van T. Trieu
(74) *Attorney, Agent, or Firm*—Hovey Williams LLP

(57) ABSTRACT

A magnetic switch apparatus (10) detects relative movement between first (12) and second (14) members and defeats attempted external magnetic manipulation of the apparatus. A rod-shaped, first switch element (20) is positioned transverse to and centrally aligned with a convex, second switch element (22) and spaced therefrom. A ring-shaped first magnet (26) is positioned about the first switch element (20) and spaced from the second element (22) in order to pull a ferromagnetic body (24) into a switch-open position out of contact with the second switch element (22) with these components mounted to the first member (12). A second magnet (18) mounted to the second member (14) is positioned and magnetically sufficient to pull the body (24) into a switch-closed position in contact with both of the switch elements (20, 22) when the members (12, 14) are in an adjacent position.

45 Claims, 1 Drawing Sheet

ALARM SWITCH

Matter enclosed in heavy brackets [ ] appears in the original patent but forms no part of this reissue specification; matter printed in italics indicates the additions made by reissue.

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention is concerned with the field of magnetic switches. In particular, the invention is concerned with a magnetic switch apparatus that detects relative movement between first and second members and defeats attempted external magnetic manipulation of the apparatus.

2. Description of the Prior Art

Prior art security alarm systems use magnetic switches attached to doors and windows and integrated with the system for detecting unauthorized opening indicating an intruder. One common type of magnetic switch is a so-called reed switch. This type of switch is subject to manipulation by an external magnet. That is, an intruder can use a magnet to hold the read switch closed (or open depending upon the control scheme) and thereby open a door or window without triggering the alarm system.

SUMMARY OF THE INVENTION

The present invention solves the prior art problem discussed above and provides a distinct advance in the state of the art. More particularly, the alarm switch hereof is configured to defeat attempts at external magnetic manipulation.

The preferred embodiment includes a rod-shaped, first switch element positioned transverse to and centrally aligned with a convex, second switch element and spaced therefrom. A ring-shaped first magnet is positioned about the first switch element and spaced from the second element in order to pull a ferromagnetic body into a switch-open position out of contact with the second switch element. These components are mounted to the first member such as a door frame. A second magnet mounted to the second member, such as the door, is positioned and magnetically sufficient to pull the body into a switch-closed position in contact with both of the switch elements when the members are in an adjacent position, that is, when the door is closed.

When the second member is moved to a separating position relative to the first member such as when the door is open, the second magnet is no longer effective to hold the body against both switch elements and the first magnet pulls the body out of contact with the second switch element to trigger the alarm system. Any use of an external magnet pulls the ferromagnetic body away from the centrally located first element thereby simulating an open door condition and triggering the alarm system. Other preferred aspects of the present invention are disclosed herein.

DETAILED DESCRIPTION OF THE PREFERRED EMBODIMENT

Figure 1:
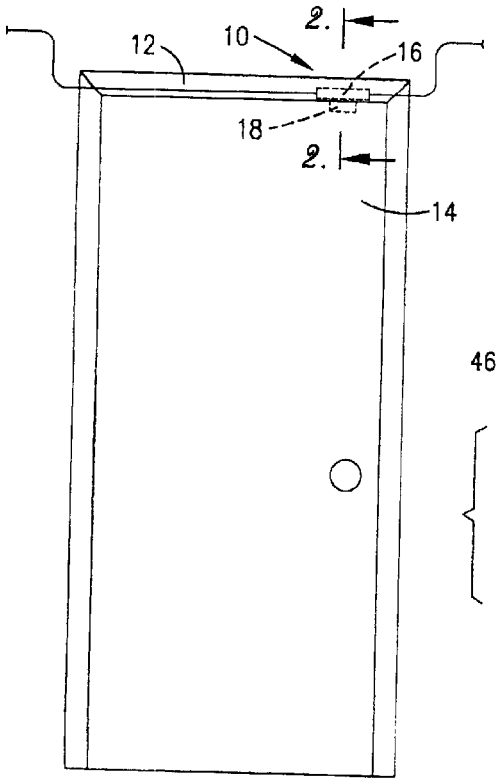
FIG. 1 illustrates preferred magnetic switch apparatus (shown in dashed lines) in accordance with the present invention and shown in use with a door frame and door.
Figure 2:
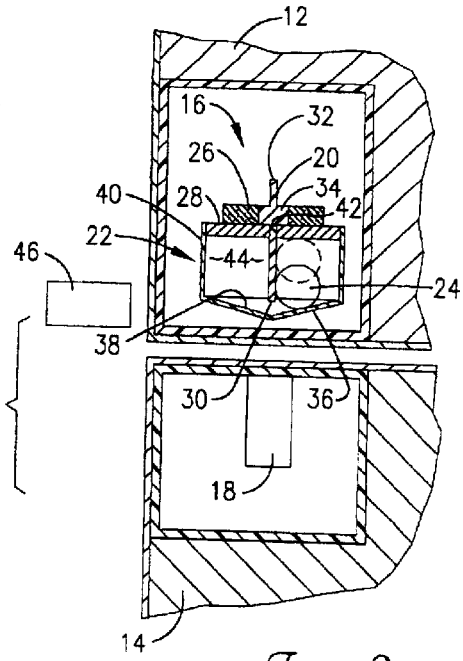
FIG. 2 is a sectional view taken along lines 2—2 of FIG. 1 and also showing an intruder magnet.

FIG. 1 illustrates preferred magnetic switch apparatus 10 (dashed lines) in accordance with the present invention shown in use with a door frame 12 and door 14. FIG. 2 more clearly illustrates the details of apparatus 10 which broadly includes switch assembly 16 and operating magnet 18.

Switch assembly 16 includes first switch element 20, second switch element 22, a ferromagnetic body in the form of ball 24, retraction magnet 26 and electrically insulating upper wall 28. First switch element 20 has a generally rod-shaped configuration and presents lower end 30 and upper end 32 with flange 34 therebetween nearest upper end 32. Element 20 is preferably composed of metal to be electrically conductive.

Electrically conductive, second switch element 22 is integrally formed of sheet metal such as by stamping and includes disk-shaped bottom wall 36 presenting contact surface 38 and further includes side wall 40 circumscribing bottom wall 36. As illustrated in FIG. 2, bottom wall 36 is shaped so that contact surface 38 presents a convex configuration and in particular, a reversed, conically shaped configuration.

Upper wall 28 is preferably composed of glass (or other insulating material) and electrically insulates switch elements 20, 22 from one another. Upper wall 28 is spaced from contact surface 38 and is circumscribed by side wall 40. The outboard face of upper wall 28 is flush with the upper edge of side wall 40.

Upper wall 28 also includes central opening 42 defined therein for receiving the lower portion of first switch element 20 with flange 34 thereof engaging the outboard face of upper wall 28. This positions first switch element 20 in alignment with the axis of contact surface 38 and spaces lower end 30 from contact surface 38.

Upper wall 28, bottom wall 36 and side wall 40 define switch chamber 44 with ferromagnetic ball 24 contained therein. As will be appreciated, ball 24 is electrically conductive and can be configured in other shapes such as a cube or cylinder, although the spherical shape is preferred.

Ball 24 is shiftable within chamber 44 between a switch-open position and a switch-closed position. In the switch-open position, ball 24 is not in contact with both switch elements 20, 22. Such a position is illustrated by the dashed lines in FIG. 2 wherein ball 24 is in contact with only one of the switch elements, namely first switch element 20. The switch-open position can occur also if ball 24 shifts along contact surface 38 toward side wall 40 and out of contact with switch element 20. The switch-closed position is illustrated by the solid lines in FIG. 2 in which ball 24 is in contact with both switch elements 20, 22.

Retraction magnet 26 presents a ring-shaped configuration in the nature of a torus and is positioned adjacent the outboard face of upper wall 28 surrounding flange 34 and thereby in surrounding relationship with first switch element 20. This arrangement positions magnet 18 spaced from contact surface 38. The magnet field strength of magnet 26 is sufficient to shift ball 24 to the switch-open position illustrated in FIG. 2 in the absence of other magnetic effects such as that of operating magnet 18 discussed further herein. It will be appreciated that magnet 26 can take other shapes such as a rod, cylinder or ball or any other shape that would fit above the switch unit and serve to shift ball 24.

In use, switch assembly 16 is installed in door frame 12 and operating magnet 18 is installed in door 14 as illustrated in FIGS. 1 and 2. With door 14 closed, frame 12 and door 14 are in an adjacent position with operating magnet 18 aligned with switch assembly 16. Magnet 18 presents sufficient field strength to shift ball 24 to the switch-closed position.

When door 14 is open, door frame 12 and door 14 are in a separated position and operating magnet 18 is no longer aligned with switch assembly 16. This allows retraction magnet 26 to shift ball 24 to the switch-open position.

FIG. 2 also illustrates intruder magnet 46 positioned adjacent the side of switch assembly 16. Placement of intruder magnet 46 as shown causes ball 24 to shift along contact surface 38 toward side wall 40 in the direction of intruder magnet 46. This is also a switch-open position and simulates the opening of door 14. Thus, the use of an intruder magnet results in an alarm condition because of the structure of switch assembly 16. In this way, apparatus 10 defeats the use of an intruder magnet which has been a problem with the prior art.

Figure 3:
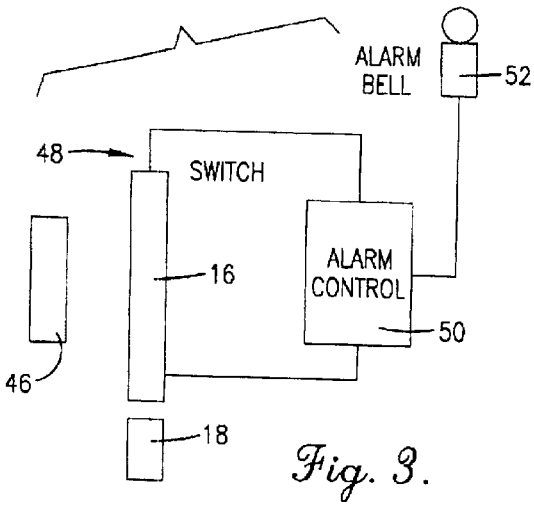
FIG. 3 is a schematic illustration of the preferred alarm system using the apparatus of FIG. 1 in accordance with the present invention.
Figure 4:
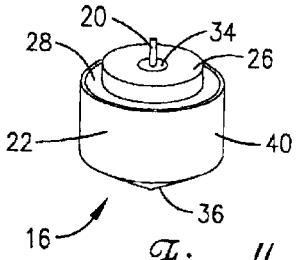
FIG. 4 is a top front pictorial view of the preferred magnet switch assembly of FIG. 1.

FIG. 3 is a schematic illustration of the preferred alarm 48 system using preferred apparatus 10. System 48 includes conventional alarm control 50 and an alarm output such as alarm bell 52. Apparatus 10 is used in system 48 as a contact switch triggering alarm control 50 whenever apparatus 10 is in the switch-open position, unless system 48 has been disarmed.

Having thus disclosed the preferred embodiment of the present invention, the following is claimed as new and desired to be secured by Letters Patent:

1. A magnetic switch apparatus for detecting relative movement between first and second members, said apparatus comprising:

a switch assembly for mounting to the first member, said assembly including a first switch element presenting a generally rod-shaped configuration, a second switch element presenting a generally disc-shaped configuration and having a contact surface, structure positioning said first switch element generally transverse to said contact surface and spaced therefrom, a ferromagnetic body shiftable between a switch-open position in which said body is out of contact with both of said first and second elements and a switch-closed position in which said body is in electrical contact with both said element and said contact surface; and a first magnet spaced from said contact surface and positioned for magnetically shifting said body to said switch-open position; and a second magnet for mounting to the second member and positioned on an opposed side of said contact surface relative to said first switch element, said second magnet being magnetically sufficient for shifting said body to said switch-closed position when the members are in an adjacent position, and for allowing said first magnet to shift said body to said switch-open position when the members are separated.

2. The apparatus as set forth in claim 1, said contact surface presenting a generally convex configuration relative to said first switch element.

3. The apparatus as set forth in claim 2, said contact surface presenting a generally reversed conically shaped configuration.

4. The apparatus as set forth in claim 1, said contact surface presenting a central axis with said first switch contact generally aligned with said axis.

5. The apparatus as set forth in claim 1, said second switch element including a side wall circumscribing said contact surface as a bottom wall.

6. The apparatus as set forth in claim 5, said second switch element being integrally formed of metal.

7. The apparatus as set forth in claim 6, said switch assembly including an electrically insulating top wall spaced from said contact surface and circumscribed by said bottom wall to define a switching chamber containing said body.

8. The apparatus as set forth in claim 7, said first switch element including an extended portion extending outwardly through said top wall.

9. The apparatus as set forth in claim 8, said first magnet being ring-shaped and positioned adjacent said top wall and surrounding said extended portion.

10. The apparatus as set forth in claim 9, said body presenting a generally spherical configuration.

11. The apparatus as set forth in claim 1, said body presenting a generally spherical configuration.

12. The apparatus as set forth in claim 1, said switch-open position being an electrically open switch position, said switch-closed position being an electrically closed switch position.

13. The apparatus as set forth in claim 1, said switch elements being located so that said body shifts to a switch-open position when the members are in the adjacent position and when an external magnet is applied in the vicinity of the first member in an attempt to manipulate magnetically said apparatus.

14. A magnetic switch apparatus for detecting relative movement between first and second members, said apparatus comprising:

a switch assembly for mounting to the first member, said assembly including a first switch element presenting a generally rod-shaped configuration, a second switch element presenting a generally disc-shaped configuration and having a convex contact surface presenting a central axis an electrically insulating top wall spaced from said contact surface, centrally receiving an extension portion of said first switch element therethrough, and positioning said first switch element generally aligned with said axis of said contact surface and spaced therefrom, a ferromagnetic ball shiftable between a switch-open position in which said body is out of contact with both of said elements and a switch-closed position in which said body is in electrical contact with both said element and said contact surface, said switch-open position being an electrically open switch position, said switch-closed position being an electrically closed switch position, and a ring-shaped, first magnet surrounding said extension portion and positioned for magnetically shifting said body to said switch-open position; and a second magnet for mounting to the second member and positioned on an opposed side of said contact surface relative to said first switch element, said second magnet being sufficient magnetically for shifting said body to said switch-closed position when the members are in an adjacent position, and for allowing said first magnet to shift said body to said switch-open position when the members are separated.

15. An alarm system for activating an alarm upon shifting of first and second members from an adjacent position to a separated position and upon attempted manipulation by an external magnet of the alarm system when the members are in the adjacent position, said system comprising:

a switch apparatus; and an alarm control coupled with said switch apparatus and responsive to a change in state thereof for activating an alarm, said switch apparatus including a switch assembly for mounting to the first member, said assembly including a first switch element presenting a generally rod-shaped configuration, a second switch element presenting a generally disc-shaped configuration and having a contact surface, structure positioning said first switch element generally transverse to said contact surface and spaced therefrom, a ferromagnetic body shiftable between a switch-open position in which said body is out of contact with both of said elements and a switch-closed position in which said body is in electrical contact with both said element and said contact surface, a first magnet spaced from said contact surface and positioned for magnetically shifting said body to said switch-open position, a second magnet for mounting to the second member and positioned on an opposed side of said contact surface relative to said first switch element, said second magnet being sufficient magnetically for shifting said body to said switch-closed position when the members are in an adjacent position, and for allowing said first magnet to shift said body to said switch-open position when the members are separated, said switch elements being located so that said body shifts to a switch-open position when the members are in the adjacent position and when an eternal magnet is applied in the vicinity of the first member in an attempt to manipulate magnetically said apparatus.

*16. A method of detecting the relative movement between first and second members from a close position where the members are adjacent, and an open position where the members are separated, said method comprising the steps of:*

*installing a switch assembly on said first member, said switch assembly including a first elongated switch element, a second switch element disposed in spaced relationship to the first element and a ferromagnetic body located adjacent the first and second switch elements;*

*when said members are in said close position, using a magnetic field of sufficient strength to maintain the ferromagnetic body in a first switch orientation in simultaneous contact with said first and second switch elements;*

*in response to relative movement of the members from said close to said open position, magnetically shifting said ferromagnetic body to a second switch orientation out of contact with said second switch element; and*

*generating a signal when said ferromagnetic body is shifted.*

*17. The method of claim 16, including the further step of using a magnet located in said second member to provide said magnetic field of sufficient strength.*

*18. The method of claim 16, said first switch element being in a generally upright orientation, with said second switch element spaced below the first switch element, said maintaining step comprising the step of maintaining the ferromagnetic body in a lower first switch orientation, said magnetic shifting step comprising the step of shifting the ferromagnetic body upwardly to said second switch orientation.*

*19. The method of claim 18, including the step of shifting said body upwardly using a retraction magnet located above said first element.*

*20. The method of claim 16, said first switch element comprising an elongated, rod-like member.*

*21. The method of claim 16, said second switch element being generally disc-shaped.*

*22. The method of claim 16, said body being spherical in shape.*

*23. A magnetic switch apparatus for detecting relative movement between first and second members from a close position where the members are adjacent, and an open position where the members are separated, said apparatus comprising a switch assembly for mounting to the first member, including a first, elongated switch element and a second switch element in spaced relationship to said first switch element, and a magnet assembly including a ferromagnetic body adjacent said first and second switch elements, said assembly operable to shift said ferromagnetic body in a first switch orientation in simultaneous contact with said first and second switch elements when said members are in said close position, and to shift said ferromagnetic body to a second switch orientation out of contact with said second switch element in response to relative movement of the members to said open position.*

*24. The apparatus of claim 23, said body being spherical.*

*25. The apparatus of claim 23, said first switch element being generally rod-shaped in configuration.*

*26. The apparatus of claim 23, said second switch element being generally disc-shaped.*

*27. The apparatus of claim 26, said second switch element including a contact surface presenting a generally reversed conically shaped configuration.*

*28. The apparatus of claim 23, said magnet assembly further including a first magnet disposed above said first contact, and a second magnet for mounting to the second member.*

*29. The apparatus of claim 23, said first switch element being in a generally upright orientation, with said second switch element disposed below the first switch element.*

*30. A method of detecting the relative movement between first and second members from a close position where the members are adjacent, and an open position where the members are separated, said method comprising the steps of:*

*installing a switch assembly on said first member, said switch assembly including a first elongated switch element, a second switch element disposed in spaced relationship to the first element, and a shiftable body movable between a first position in simultaneous contact with said first and second switch elements, and a second position out of said simultaneous contact;*

*when said members are in said close position, using a magnetic field of sufficient strength to maintain said body in one of said first and second positions;*

*in response to movement of the members from said close to said open position, magnetically moving the body to the other of said first and second positions; and*

*generating a signal when said body is moved.*

*31. The method of claim 30, said magnetic moving step comprising the steps of using a magnetic field developed between said body and a first cooperable component on said first member.*

*32. The method of claim 31, said first component comprising a ring-shaped magnet.*

*33. The method of claim 30, said magnetic field of sufficient strength being developed between said body and a second cooperable component on said second member.*

*34. The method of claim 33, said second component comprising a magnet mounted on said second member.*

*35. The method of claim 30, said first switch element being in a generally upright orientation, with said second switch element spaced below the first switch element, said maintaining step comprising the step of maintaining the ferromagnetic body in a lower first switch orientation, said magnetic moving step comprising the step of shifting the ferromagnetic body upwardly to said second switch orientation.*

*36. A method comprising the steps of:*

*providing a switch assembly including a first elongated switch element, a second switch element disposed in spaced relationship to the first element and a shiftable body movable between a first position in simultaneous contact with said first and second switch elements, and a second position out of said simultaneous contact;*

*using a magnetic field of sufficient strength to maintain said body in one of said first and second positions; and*

*magnetically shifting the body to the other of first and second positions in response to a change of magnetic condition proximal to the switch assembly.*

*37. The method of claim 36, including the step of mounting said switch assembly on a first member, said change of condition comprising moving a second member relative to the first member.*

*38. The method of claim 37, said second member being equipped with a magnet, said magnetic moving step occurring by virtue of the magnetic attraction between said body and said second member magnet.*

*39. A switch assembly comprising:*

*a first wall, a second wall, and a circumscribing side wall cooperatively defining a switch chamber;*

*a first switch element, at least portion of which extends into said switch chamber; and*

*a shiftable body located within said switch chamber; and*

*a component associated with one of said first or second walls;*

*said body and component cooperatively formed to be magnetically attractive so that the body is magnetically moved within said chamber by virtue of the presence of said component.*

*40. The switch assembly of claim 39, said second wall and said side wall comprising a second switch element.*

*41. The switch assembly of claim 40, said body being shiftable between a first position in simultaneous contact with said first and second switch elements and a second position out of said simultaneous contact.*

*42. The switch assembly of claim 41, said component comprising a magnet.*

*43. The switch assembly of claim 42, said body retained in said second position by virtue of the magnetic attraction between said body and said component and shiftable to said first position in response to a change of magnetic condition proximal to the switch assembly.*

*44. The switch assembly of claim 39, said first switch element presenting an elongated, rod-like configuration which is oriented in a substantially upright manner.*

*45. The switch assembly of claim 39, said component secured to said first wall.*

* * * * *